United States Patent
Mabu

(10) Patent No.: US 9,373,991 B2
(45) Date of Patent: Jun. 21, 2016

(54) METHOD FOR MANUFACTURING LAMINATED IRON CORE

(71) Applicant: MITSUI HIGH-TEC, INC., Kitakyushu-shi, Fukuoka (JP)

(72) Inventor: Hirotoshi Mabu, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 415 days.

(21) Appl. No.: 14/071,904

(22) Filed: Nov. 5, 2013

(65) Prior Publication Data

US 2014/0131919 A1    May 15, 2014

(30) Foreign Application Priority Data

Nov. 9, 2012   (JP) ................................. 2012-247728

(51) Int. Cl.
*H02K 15/03*      (2006.01)
*H01F 7/02*       (2006.01)

(52) U.S. Cl.
CPC .............. *H02K 15/03* (2013.01); *H01F 7/0221* (2013.01)

(58) Field of Classification Search
CPC ...................................................... H02K 15/03
USPC ......................................... 264/271.1, 272.19
See application file for complete search history.

(56) References Cited

FOREIGN PATENT DOCUMENTS

| JP | 2006211748 A | * | 8/2006 |
| JP | 2010-187535 | | 8/2010 |
| JP | 2011-055687 | | 3/2011 |

OTHER PUBLICATIONS

JPO machine translation of JP 2006-211748, retrieved Feb. 16, 2016, all pages.*

* cited by examiner

*Primary Examiner* — Timothy Kennedy
(74) *Attorney, Agent, or Firm* — Greenblum & Bernstein, P.L.C.

(57) ABSTRACT

A method for manufacturing a laminated iron core is provided. A laminated iron core body including a permanent magnet inserted into a magnet-insert hole is arranged between a molding die and a holding die. A cull plate is arranged between the molding die and the laminated iron core body. The cull plate has a groove shaped runner directed toward the magnet-insert hole from a resin reservoir and provided with a gate hole communicating with the magnet-insert hole, and a through hole which vertically passes through the cull plate is formed in the runner of the cull plate at a different position from a position of the gate hole. After the magnet-insert hole is filled with the mold resin a resin residue remaining in the cull plate is pushed off and removed from the gate hole and the through hole.

6 Claims, 4 Drawing Sheets

METHOD FOR MANUFACTURING LAMINATED IRON CORE

BACKGROUND OF THE INVENTION

1. Technical Field

The present invention relates to a method for manufacturing a laminated iron core used for a motor in which permanent magnets respectively inserted into a plurality of magnet-insert holes formed so as to pass through in axial directions are sealed with a resin.

2. Background Art

Usually, as disclosed in JP-A-2010-187535, a method for manufacturing a laminated iron core is known in which a plurality of magnet-insert holes are provided in a laminated iron core body and permanent magnets are respectively inserted into the magnet-insert holes and sealed with a resin. In this manufacturing method, as shown in FIG. 3, a permanent magnet 72 is inserted into each of a plurality of magnet-insert holes 71 provided in a laminated iron core 70 and heated at a prescribed temperature. Then, each of the magnet-insert holes 71 is filled with a mold resin 75 from a lower die 73 (or an upper die 74) to harden the mold resin 75. Thus, the permanent magnet 72 is fixed to a laminated iron core body 76. FIG. 3 also shows a conveying jig 77, a lower fixing plate 78, an upper fixing plate 79, a guide post 80, and a plunger 81.

In the manufacturing method disclosed in JP-A-2010-187535, the hardened mold resin 75, namely, a resin residue remains in a resin passage part and a gate part on the surface of the laminated iron core. Accordingly, after the mold resin is injected, a process for removing the resin residue is necessary. Thus, a method for manufacturing a laminated iron core is proposed in which such a dummy plate (refer it also as to a cull plate or an intermediate plate) as described in JP-A-2011-055687 is used.

In the method for manufacturing the laminated iron core disclosed in JP-A-2011-055687, as shown in FIG. 4, a dummy plate 82 made of metal is arranged between a laminated iron core body 76 and a lower die (or an upper die), and a mold resin 75 is injected from a gate hole 83 as a resin injection opening formed in the dummy plate 82. Thus, since the injected mold resin 75 adheres to and remains on the surface of the dummy plate 82 and does not adhere to the surface of the laminated iron core body 76, the dummy plate 82 is removed from the laminated iron core body 76 to remove a resin residue at the same time. As the dummy plate is prepared so as to meet the kind of the laminated iron core body, a plurality of kinds of laminated iron core bodies may be advantageously sealed with a resin in one molding die. FIG. 4 also shows a runner 84 (a resin passage) formed in the dummy plate 82.

SUMMARY OF THE INVENTION

However, when the plurality of kinds of laminated iron cores are sealed with the resin by using the dummy plate, since the molding die is not changed, the gate holes need to be formed in the dummy plate so as to meet the kinds of the laminated iron cores, namely, the sizes of the laminated iron core bodies, the forms and arranged positions of magnet-insert holes. As a result, runners which guide the mold resin from a resin reservoir of the molding die to the gate holes are formed in complicated shapes. Thus, when the resin remaining in the dummy plate is thrust down from the gate holes after the resin is completely injected to the magnet-insert holes, the resin in the runner parts is broken, so that the resin may probably remain in the dummy plate. In this case, the dummy plate needs to be temporarily taken out from a production line to carry out a removing operation of the remaining resin, which forces a worker who is engaged in the line to take an unnecessary time and labor. Further, when there is no spare dummy plate, the production line needs to be stopped to clean the dummy plate, so that productivity is deteriorated. A phenomenon that the resin is broken, which especially occurs in the runner parts, outstandingly arises when the length of the runners is formed to be large.

One non-limited object of the present invention to provide a method for manufacturing a laminated iron core in which a molding die does not need to be changed depending on the kind of the laminated iron core and the laminated iron core can be manufactured without stopping a production line.

An aspect of the present invention provides a method for manufacturing a laminated iron core, the method including: arranging a laminated iron core body between a molding die and a holding die, wherein the laminated iron core body includes a permanent magnet inserted into a magnet-insert hole; arranging a cull plate between the molding die and the laminated iron core body, wherein the cull plate has a groove shaped runner directed toward the magnet-insert hole from a resin reservoir and provided with a gate hole communicating with the magnet-insert hole; and filling the magnet-insert hole with a mold resin through the cull plate from the resin reservoir of the molding die to fix the permanent magnet to the magnet-insert hole, wherein a through hole which vertically passes through the cull plate is formed in the runner of the cull plate at a different position from a position of the gate hole, after the magnet-insert hole is filled with the mold resin, the laminated iron core including the permanent magnet sealed with the resin is taken out from the molding die and the holding die, the cull plate is separated from the laminated iron core, and a resin residue remaining in the cull plate is pushed off and removed from the gate hole and the through hole.

The method may be configured so that the cull plate is formed with first and second cull plates, and the runner and the through hole are formed in the first cull plate which contacts the molding die, and the gate hole is formed in the second cull plate which contacts the laminated iron core body.

The method may be configured so that another gate hole is formed in the first cull plate, wherein the another gate hole communicates with the gate hole of the second cull plate and is formed to be larger than the gate hole.

The method may be configured so that the cull plate is used as a conveying tray in which a post for positioning the laminated iron core is formed.

The method may be configured so that the through hole formed in the cull plate has a tapered configuration in which a diameter is gradually reduced in a direction in which the resin is injected.

The method may be configured so that a peripheral wall of the runner formed in the cull plate has a tapered configuration in which a diameter is gradually reduced in a direction in which the resin is injected.

An advantage of the above configuration is described, but not limited to this. When the resin residue remaining in the cull plate is removed, even if a runner part is formed to be complicated, since the through hole is provided in addition to the gate hole, a force could be equalized to push out the resin residue in the cull plate. Thus, the resin residue can be easily removed and cleaned from the cull plate without breaking the runner part. Thus, the cull plate can be repeatedly used for a production without stopping a production line.

Even when the laminated iron core body is not present on the surface of the through hole formed in the first cull plate, since the thorough hole is closed by the second cull plate, the mold resin does not leak from the through hole. Further, when the cull plate is formed with at least two or more flat plates, the strength of the cull plate can be increased in a direction of thickness. Thus, the cull plate is not deformed by a pressure received from a plunger so that the resin may be assuredly injected. In addition, even if a adhesion force is high between the laminated iron core and the resin in the cull plate, since the second cull plate is provided to be contact with the first cull plate which is provided with the through hole, a contact area of the resin and the laminated iron core is reduced, thereby preventing a piece of the laminated iron core from peeling.

When the first gate hole is formed to be larger than the gate hole, the first cull plate can be easily separated from the second cull plate. Further, an abrasion of the gate hole by the mold resin can be reduced.

When the cull plate also serves as the conveying tray, since the resin is injected from a lower die, the laminated iron core does not need to be vertically inverted and positioned in the molding die. Accordingly, a positioning operation is easy.

When the through hole is formed to be tapered so that a diameter is gradually reduced in a resin injection direction, the resin residue can be easily removed and the runner part can be prevented from being broken.

When a peripheral wall of the runner is formed to be tapered so that a diameter is gradually reduced in the resin injection direction, the resin residue can be easily removed and the runner part can be prevented from being broken.

DETAILED DESCRIPTION OF THE EXEMPLARY EMBODIMENTS

Figure 1A:
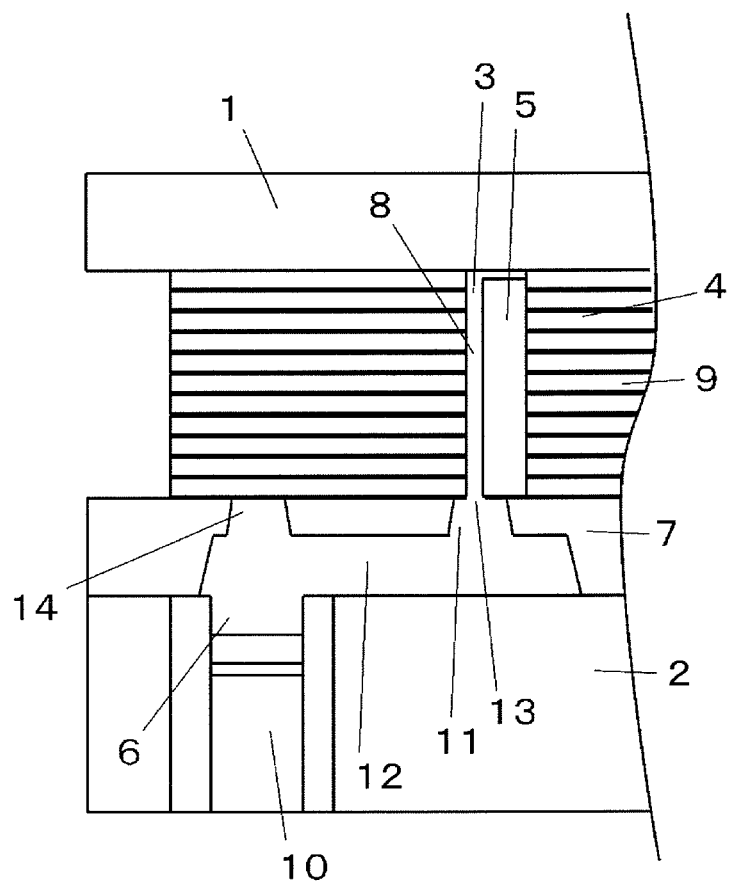
FIG. 1A is a cross-sectional view partly showing a method for sealing with a resin a laminated iron core according to a first exemplary embodiment of the present invention.

As shown in FIG. 1, in a method for manufacturing a laminated iron core according to a first exemplary embodiment of the present invention, between an upper die 1 as one example of a holding die and a lower die 2 as one example of a molding die, a laminated iron core body 4 is arranged which has a plurality of paired and vertically passing-through magnet-insert holes 3 in inside areas in radial directions, into which permanent magnets 5 (unexcited permanent magnets) are respectively inserted, and the magnet-insert holes 3 are filled with a mold resin 8 through a cull plate 7 from a resin reservoir pot 6 as one example of a resin reservoir provided in the lower die 2. A height of the permanent magnet 5 is the same as a height of the laminated iron core body 4 or smaller within a narrow range (0.1 to 2 mm).

The laminated iron core body 4 is provided with a plurality of magnet-insert holes 3. In a center of the laminated iron core body 4, a shaft hole for inserting a shaft not shown in the drawing is formed. The laminated iron core body 4 is formed in such a way that iron core pieces 9 of the same shapes formed by press working a magnetic plate material (for instance, an electromagnetic steel plate) are caulked and laminated.

As shown in FIG. 1A, the lower die 2 includes the resin reservoir pot 6 having a circular form in cross-section at a position corresponding to an outer side in the radial direction of the magnet-insert holes 3. The resin reservoir pot 6 has a structure which pushes out the liquid mold resin 8 (for instance, a thermosetting resin) stored therein toward a side of the laminated iron core body 4 by a plunger 10 which is moved upward and downward by a cylinder not shown in the drawing.

The cull plate 7 is formed with one flat plate (for instance, a stainless steel plate or a steel plate) whose thickness is within a range of, for instance, 1 to 10 mm, and has a runner 12 which is formed with a groove opened to the bottomed lower die side and has an upstream side communicating with the resin reservoir pot 6 and a downstream side connected to a gate hole 11 formed with a through hole. A depth of the runner 12 is within a range 30 to 70% as large as the thickness of the cull plate 7. A peripheral wall of the runner 12 has a tapered form in which a diameter is gradually reduced in a direction in which a resin is injected (a resin injection direction). The gate hole 11 formed in the downstream side of the runner 12 is configured in a circular truncated cone in which a diameter is gradually reduced in the resin injection direction and located in a gap between the upper magnet-insert hole 3 and the permanent magnet 5 to form a resin injection opening 13. A through hole 14 formed in the upstream side of the runner 12 is configured in a circular truncated cone in which a diameter is gradually reduced in the resin injection direction and abuts on the surface of the laminated iron core body 4 in an outer side in the radial direction of the upper magnet-insert hole 3 so that the mold resin 8 does not leak from the through hole 14.

Here, taper angles or cone angles of the through hole 14 and the gate hole 11 in which the diameters are gradually reduced do not need to be the same. The diameters of the through hole 14 and the gate hole 11 do not need to be the same. Further, the through hole 14 does not need to be formed in the upstream side of the runner 12 and may be formed in a midstream side or the resin reservoir except a position where the gate hole 11 is formed. Further, the number of the through holes 14 is not limited to one and a plurality of through holes 14 may be formed depending on the length of the runner 12. If the plurality of through holes are formed, a below-described resin residue 8' is more assuredly removed.

Now, a method for manufacturing the laminated iron core using a resin seal device will be described below. The laminated iron core body 4 which is preheated and mounted on the cull plate 7 is arranged between the upper die 1 and the lower die 2. The upper die 1 is lowered and the laminated iron core body 4 and the cull plate 7 are positioned by fitting posts formed in the cull plate 7 to holes of the upper die 1 which are not in the drawing. In the present exemplary embodiment, the laminated iron core body 4 is positioned and held between the lower die 2 and the upper die 1 under a state that the shaft hole of the laminated iron core body 4 is fitted to and mounted on the post of the cull plate 7 not shown in the drawing. Namely, the cull plate 7 also serves as a conveying tray.

Under this state, the plunger 10 is pushed up by the cylinder not shown in the drawing to push upward the molten mold resin 8 in the resin reservoir pot 6. Thus, the magnet-insert hole 3 is filled with the mold resin 8 through the gate hole 11 from the runner 12. After that, the upper die 1 is lifted to take out the laminated iron core body 4 from the lower die 2. Then, when an external force is applied to the cull plate 7, the hardened mold resin 8 is broken in the part of the gate hole 11 or in the vicinity thereof. Thus, under a state that a part of the hardened mold resin remains in the cull plate 7, the cull plate 7 is separated form the laminated iron core body 4. Namely, the resin residue 8' remains in the cull plate 7.

Figure 1B:
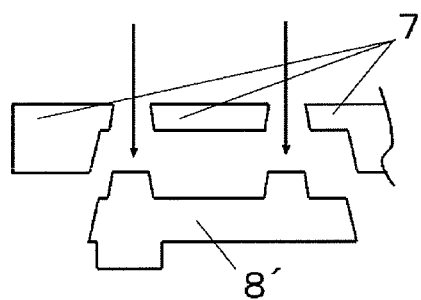
FIG. 1B is an explanatory view showing a method for manufacturing the laminated iron core in FIG. 1A.

Subsequently, as shown in FIG. 1B, when a part of the resin residue 8' staying in the cull plate 7 is pushed off from the gate hole 11 and the through hole 14 by a protruding fitting not shown in the drawing, the resin residue 8' is removed from the cull plate 7. After that, the cull plate 7 is cleaned and repeatedly used. In such a way, not only the gate hole 11, but also the through hole 14 is used to push off the resin residue 8' at the same time. Thus, even when the runner 12 is formed to be long, the resin residue 8' can be assuredly removed without breaking the resin residue. Here, the through hole 14 preferably has the smallest size through which the protruding fitting is allowed to pass. Thus, little resin enters the through hole 14, so that an increase of use of the resin can be suppressed. Further, since the gate hole 11 and the through hole 14 are formed in the shapes of the circular truncated cones, the resin residue is easily pushed off. Further, since the peripheral wall of the runner 12 has the tapered form, the resin residue 8' is easily removed.

Figure 2A:
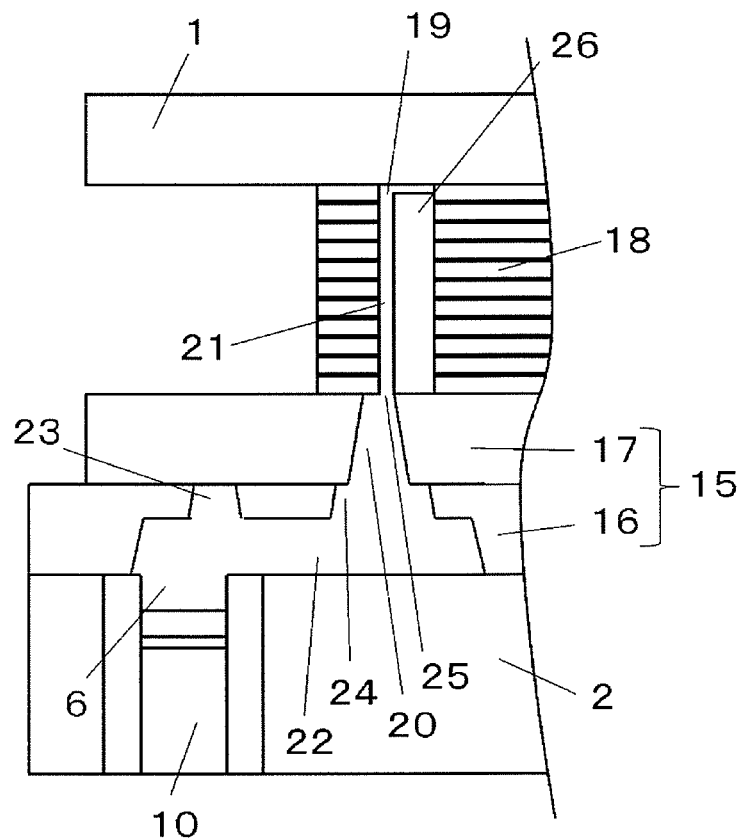
FIG. 2A is a cross-sectional view partly showing a method for sealing with a resin a laminated iron core according to a second exemplary embodiment of the present invention.
Figure 2B:
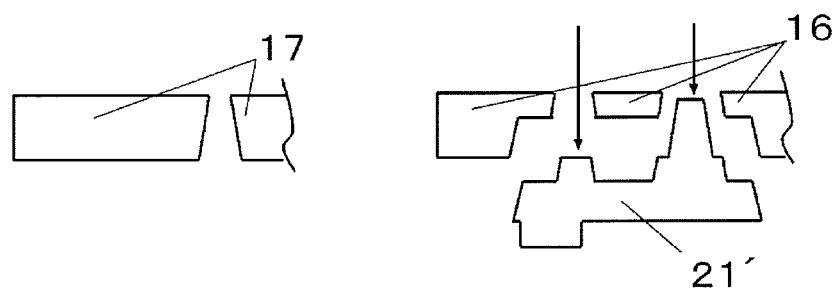
FIG. 2B is an explanatory view showing a method for manufacturing the laminated iron core in FIG. 2A.
Figure 3:
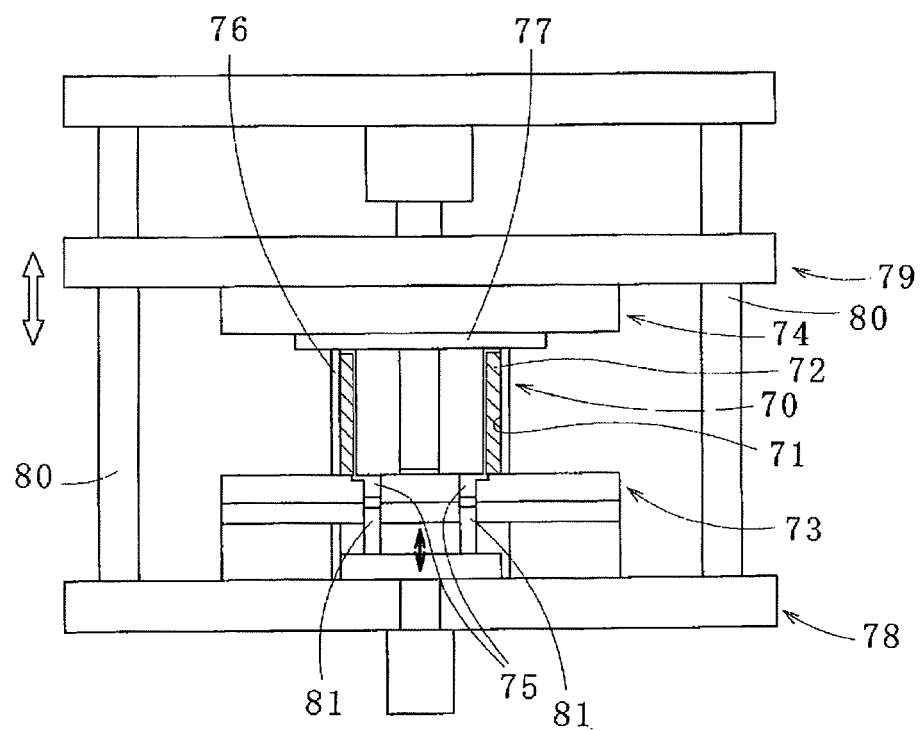
FIG. 3 is an explanatory view showing a method for manufacturing a laminated iron core according to an example of a related art.
Figure 4:
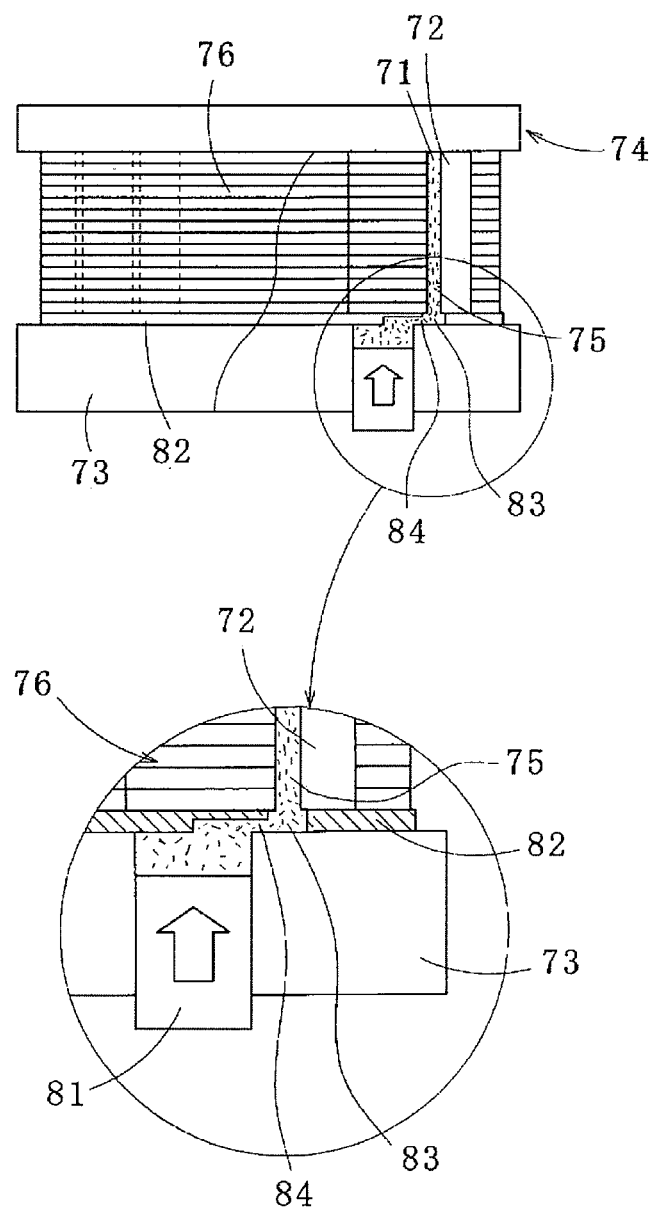
FIG. 4 is an explanatory view showing a method for manufacturing a laminated iron core according to an example of a related art.

Now, in a method for manufacturing a laminated iron core according to a second exemplary embodiment of the present invention, will be below described different points from the method for manufacturing the laminated iron core according to the first exemplary embodiment of the present invention. As for an upper die 1, a lower die 2, a resin reservoir pot 6 and a plunger 10, the same members as those of the method for manufacturing the laminated iron core according to the first exemplary embodiment are used. As shown in FIGS. 2A and 2B, between the upper die 1 and the lower die 2, a laminated iron core body 18 on which a cull plate 15 is mounted is arranged. As described above, in the laminated iron core body 18, a magnet-insert hole 19 and a permanent magnet 26 inserted into the magnet-insert hole 19 are provided. An external form of the laminated iron core body 18 is smaller than that of the laminated iron core body described in the first exemplary embodiment and a space is formed between the upper die 1 and the lower die 2 located in an extension line of the plunger 10. In the present exemplary embodiment, the cull plate 15 is formed with a first cull plate 16 and a second cull plate 17 respectively made of two stainless steel or steel flat plates with the thickness of, for instance, 1 to 10 mm. In the first cull plate 16 which contacts the resin reservoir pot 6, a runner 22 is configured which is formed with a groove opened to the bottomed lower die side and guides a mold resin 21 to a gate hole 20 from the resin reservoir pot 6. In an upstream side of the runner 22, a through hole 23 is formed. In a downstream side of the runner 22, a first gate hole 24 is formed which communicates with the above-described gate hole 20. In the second cull plate 17 which contacts the laminated iron core body 18, the above-described gate hole 20 is formed which pours the mold resin 21 into the magnet-insert hole 19 formed in the laminated iron core body 18.

The gate hole 20 is formed in the second cull plate 17 so as to vertically pass through. The gate hole 20 is formed in a circular truncated cone in which a diameter is gradually reduced in a resin injection direction and located in a gap between the upper magnet-insert hole 19 and the permanent magnet 26 to form a resin injection opening 25. The first gate hole 24 is also formed in a circular truncated cone in which a diameter is gradually reduce in the resin injection direction so that a diameter enlarged side of the gate hole 20 may be accommodated in a diameter reduced side of the first gate hole 24. Thus, an abrasion which the gate hole 20 receives from the mold resin 21 can be reduced. Further, the through hole 23 formed in the upstream side of the runner 12 is formed in a circular truncated cone in which a diameter is gradually reduced in the resin injection direction and abuts on the surface of the second cull plate 17 piled upward. Thus, even when the through hole 23 does not abut on the surface of the laminated iron core body 18 as in the first exemplary embodiment, the through hole 23 is closed. Accordingly, the mold resin 21 does not leak from the through hole 23. In such a way, the first cull plate 16 and the second cull plate 17 form an integral body by the two plates to carry out the same operation as that of the cull plate 7 provided with the runner 12 and the gate hole 11 in the first exemplary embodiment.

A method for injecting the resin by using the cull plate 15 is the same as that of the first exemplary embodiment. When the cull plate 15 is removed, the two piled plates of the first cull plate 16 and the second cull plate 17 are initially separated from the laminated iron core body 18. Then, the first cull plate 16 is separated from the second cull plate 17. As shown in FIG. 2B, since the enlarged side in diameter of the gate hole 20 is formed so as to be accommodated in the reduced side in diameter of the first gate hole 24, when the second cull plate 17 is lifted from the first cull plate 16, the first cull plate 16 and the second cull plate 17 can be easily separated from each other. At this time, a resin residue 21' formed in the gate hole 20 of the second cull plate 17 remains on the first cull plate 16. After that, when a part of the resin residue 21' staying in the first cull plate 16 is pushed off from the first gate hole 24 and the through hole 23 by a protruding fitting not shown in the drawing, the resin residue 21' is removed from the first cull plate 16. After that, the cull plate 15 is cleaned and repeatedly used.

As described above, in the runner of the cull plate, since the through hole is formed in a position except a position where the gate hole is formed, the resin residue remaining in the cull plate can be assuredly removed and a production can be continuously carried out without stopping a production line, so that a deterioration of productivity can be prevented.

In the above-described embodiments, the resin reservoir pot is provided in the lower die. Alternatively, a resin reservoir pot may be provided in an upper die to fill magnet-insert holes respectively with a mold resin from an upper part. In this case, a cull plate and a conveying tray are formed as separate bodies and the cull plate is arranged between the upper die and a laminated iron core body. Further, the number of the cull plates is not limited to two and two or more cull plates may be used. When the two or more cull plates are used, even if an external form of a laminated iron core body is formed to be smaller than an extension line of a plunger, the cull plates are not deformed by a pressure of the plunger. Thus, a resin can be stably injected. Further, as described above, the gate hole and the through hole are configured in the circular truncated cones. Alternatively, they may be configured in elliptic truncated cones to have the same effects.

The present application is based upon and claims the benefit of priority of Japanese Patent Application No. 2012-247728 filed on Nov. 9, 2012, the contents of which are incorporated herein by reference in its entirety.

What is claimed is:

1. A method for manufacturing a laminated iron core, the method comprising:

arranging a laminated iron core body between a molding die and a holding die, wherein the laminated iron core body includes a permanent magnet inserted into a magnet-insert hole;

arranging a cull plate between the molding die and the laminated iron core body, wherein the cull plate has a groove shaped runner directed toward the magnet-insert hole from a resin reservoir and provided with a gate hole communicating with the magnet-insert hole; and filling the magnet-insert hole with a mold resin through the cull plate from the resin reservoir of the molding die to fix the permanent magnet to the magnet-insert hole, wherein a through hole which vertically passes through the cull plate is formed in the runner of the cull plate at a different position from a position of the gate hole, after the magnet-insert hole is filled with the mold resin, the laminated iron core including the permanent magnet sealed with the resin is taken out from the molding die and the holding die, the cull plate is separated from the laminated iron core, and a resin residue remaining in the cull plate is pushed off and removed from the gate hole and the through hole.

2. The method according to claim 1, wherein
the cull plate is formed with first and second cull plates, and
the runner and the through hole are formed in the first cull plate which contacts the molding die, and the gate hole is formed in the second cull plate which contacts the laminated iron core body.

3. The method according to claim 2, wherein
another gate hole is formed in the first cull plate, wherein said another gate hole communicates with the gate hole of the second cull plate and is formed to be larger than the gate hole.

4. The method according to claim 1, wherein
the cull plate is used as a conveying tray in which a post for positioning the laminated iron core is formed.

5. The method according to claim 1, wherein
the through hole formed in the cull plate has a tapered configuration in which a diameter is gradually reduced in a direction in which the resin is injected.

6. The method according to claim 1, wherein
a peripheral wall of the runner formed in the cull plate has a tapered configuration in which a diameter is gradually reduced in a direction in which the resin is injected.

\* \* \* \* \*